(12) United States Patent
Perelman et al.

(10) Patent No.: US 8,037,014 B1
(45) Date of Patent: Oct. 11, 2011

(54) METHOD AND APPARATUS FOR AGGREGATING AND SUBMITTING FORM DATA

(75) Inventors: Roberto Perelman, Sunnyvale, CA (US); John P. Brinkman, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1625 days.

(21) Appl. No.: 11/115,665

(22) Filed: Apr. 26, 2005

(51) Int. Cl.
*G06F 7/00* (2006.01)
*G06F 17/30* (2006.01)

(52) U.S. Cl. ........................ 707/600; 707/602

(58) Field of Classification Search .................. 707/600, 707/602, 687, 693, 802, 812, 822, 823
See application file for complete search history.

(56) References Cited

U.S. PATENT DOCUMENTS

| | | | |
|---|---|---|---|
| 6,084,585 A | 7/2000 | Kraft et al. | |
| 6,137,488 A | 10/2000 | Kraft et al. | |
| 6,272,485 B1 | 8/2001 | Sragner | |
| 6,272,506 B1 | 8/2001 | Bell | |
| 6,295,536 B1 | 9/2001 | Sanne | |
| 6,314,415 B1 | 11/2001 | Mukherjee | |
| 6,553,407 B1 | 4/2003 | Ouchi | |
| 7,000,179 B2 | 2/2006 | Yankovich et al. | |
| 2003/0004836 A1 | 1/2003 | Otter et al. | |
| 2004/0068693 A1 | 4/2004 | Rawat et al. | |
| 2004/0196314 A1 | 10/2004 | Bhogal et al. | |
| 2005/0251733 A1 | 11/2005 | Elkady | |
| 2006/0136810 A1 | 6/2006 | Truong et al. | |
| 2006/0174210 A1* | 8/2006 | Richards et al. | 715/769 |

* cited by examiner

*Primary Examiner* — Charles Rones
*Assistant Examiner* — Fariborz Khoshnoodi
(74) *Attorney, Agent, or Firm* — Robert C. Kowert; Meyertons, Hood, Kivlin, Kowert & Goetzel, P.C.

(57) ABSTRACT

A system that aggregates and submits data from a customized packet of forms. The system first creates a single data unit for storing form data which is initially empty. It then opens a main document, which has associated forms. For each associated form in the main document, the system extracts data from client-populated fields in the associated form and concatenates data from the associated form to the single data unit. In this way, data from every associated form in the customized packet of forms is aggregated into the single data unit. The system then submits the single data unit.

21 Claims, 3 Drawing Sheets

METHOD AND APPARATUS FOR AGGREGATING AND SUBMITTING FORM DATA

BACKGROUND

1. Field of the Invention

The present invention relates to techniques for processing data entered into forms. More specifically, the present invention relates to a method and apparatus for aggregating and submitting data entered into a customized packet of forms.

2. Related Art

Electronic forms have become the primary means by which organizations gather data from their clients. Whether the form is web-based or downloadable, the form enables organizations to gather information about their clients to facilitate transactions with their clients.

As Internet usage becomes increasingly more prevalent, more forms are being processed online. In many cases, organizations require a user to fill out more than one form. Furthermore, the set of forms that an organization requires a user to fill out may differ depending on requirements for a specific user. For instance, the Internal Revenue Service requires specific forms to be sent along with a taxpayer's tax return depending on the taxpayer's tax profile. Hence, if an organization wants the user to fill out more than one form, it is often the case that different sets of forms need to be sent to different users.

To deal with this problem, organizations often use a "mega-form," which contains all possible combinations of forms that different users might require depending on their circumstances. Unfortunately, the user must sift through the mega-form to find the applicable forms to complete. After completing the applicable forms, the user submits the data from the mega-form to the server for processing. The server then parses the data submitted by the mega-form to extract the relevant data.

Another option is to create a customized application. This customized application first presents the user with a series of questions. Next, the customized application asks the user to fill out the applicable forms based on the answers to the series of questions, and then sends data from the applicable forms back to the server for processing. Unfortunately, in order to use this technique, a custom application must be written for each situation. An example of this type of application is tax preparation software, wherein the application guides the user through a tax interview and then returns the completed forms to the Internal Revenue Service.

Yet another option is for the user to download and fill out individual forms, which are separately submitted to the server for processing. Unfortunately, since each form is submitted separately, the server must somehow associate the data from each submitted form with the correct user.

Yet another option is for the user to fill out a series of web-based forms. In this case, the website presents a form to the user and after the user completes the form, the website returns the form to the server for processing. In this type of system, each form must be submitted to the server prior to starting the next form. Unfortunately, if the user wants to edit a submitted form, the submitted form must be retrieved from the server, corrected, and then resubmitted to the server.

As can be seen from the discussion above, existing techniques for submitting multiple related forms suffer from a number of drawbacks.

Hence, what is needed is a method and an apparatus which supports aggregating and submitting data from a customized packet of forms without the problems described above.

SUMMARY

One embodiment of the present invention provides a system that aggregates and submits data from a customized packet of forms. The system first creates a single data unit for storing form data which is initially empty. It then opens a main document, which has associated forms. For each associated form in the main document, the system extracts data from client-populated fields in the associated form and concatenates data from the associated form to the single data unit. In this way, data from every associated form in the customized packet of forms is aggregated into the single data unit. The system then submits the single data unit.

In a variation on this embodiment, if the main document is also a form, the system extracts data from the main document and concatenates data from the main document to the single data unit.

In a variation on this embodiment, prior to extracting the data from the main document, the system receives information about a user. Next, the system selects forms to be included in the customized packet of forms based on the information about the user. The system then produces a customized packet of forms which includes the selected forms and sends the customized packet of forms to the user.

In a variation on this embodiment, after the user receives the customized packet of forms, the user is allowed to: open the customized packet of forms; fill out forms in the customized packet of forms; and to click on a submit button in the main document to submit data from the customized packet of forms.

In a variation on this embodiment, if an associated form contains lower-level associated forms, the system recursively: opens each lower-level associated form in the associated form; extracts data from each lower-level associated form; and concatenates data from each lower-level associated form to the single data unit.

In a variation on this embodiment, a script in the main document is used to extract data from the associated form. The script is written so that it is general enough to work with any combination of associated forms.

In a variation on this embodiment, when the system submits the single data unit, it submits the single data unit to a server.

Table 1 presents a sample script that extracts and aggregates data from a packet of forms in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Associated Forms

Figure 1:
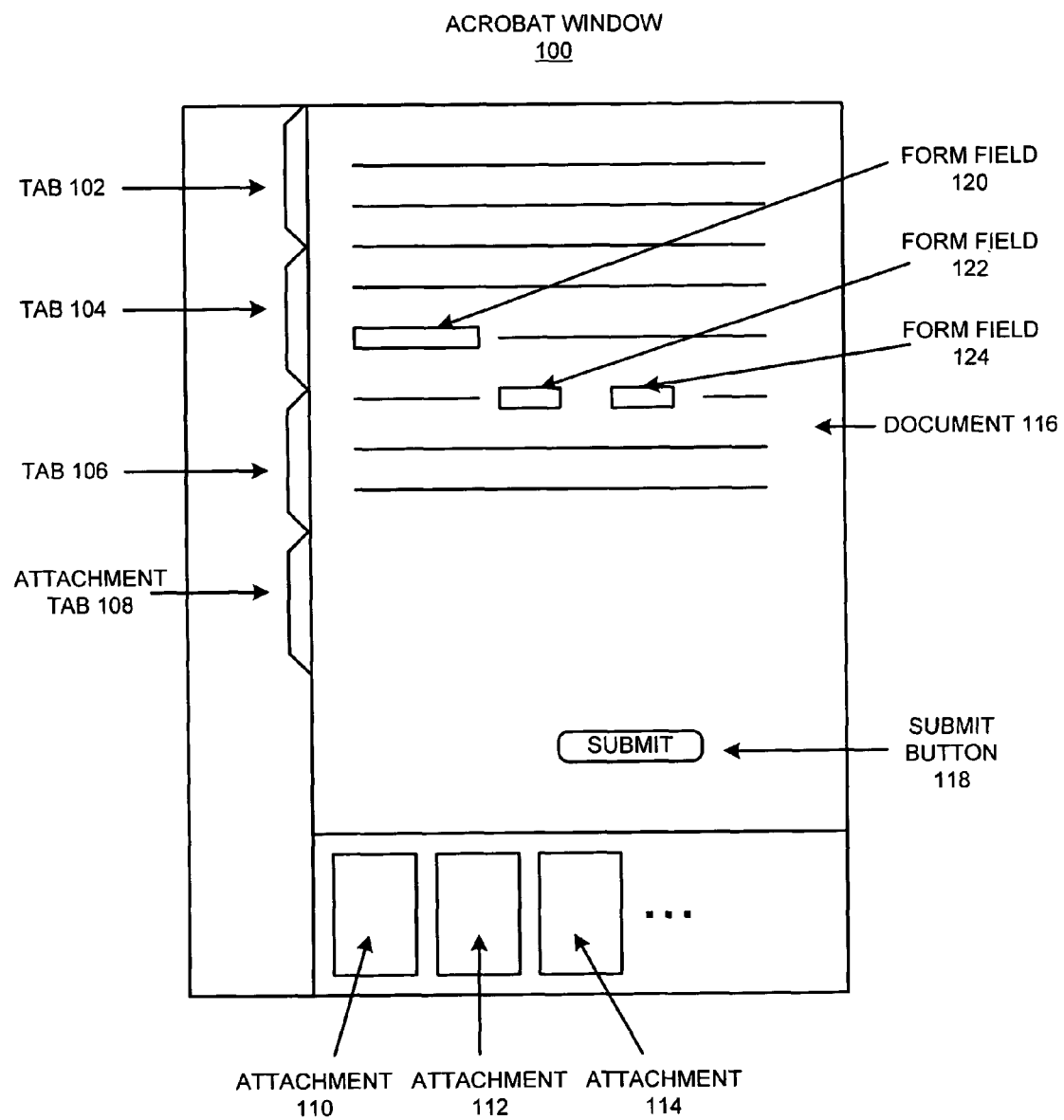
FIG. 1 presents a block diagram of an Adobe Acrobat™ window in accordance with an embodiment of the present invention.

FIG. 1 presents a diagram of an Adobe Acrobat™ window in accordance with an embodiment of the present invention. It contains Acrobat window 100, tab 102, tab 104, tab 106, attachment tab 108, attachment 110, attachment 112, attachment 114, document 116, submit button 118, form field 120, form field 122, form field 124.

A user can click on a tab to bring up a specific set of features. In one embodiment of the present invention, the user clicks on attachment tab 108 which causes Acrobat to display any attachments attached to the Acrobat document.

In one embodiment of the present invention, document 116 is a main document which has submit button 118. In this case, document 116 is a container document which contains attachment 110, attachment 112, and attachment 114. Note that document 116 can be a single file that contains associated attachments. Also note that an attachment can itself contain attachments, which are referred to as "lower-level attachments" in this specification.

In one embodiment of the present invention, in addition to containing attachments, document 116 also contains text, as well as form field 120, form field 122, and form field 124. Note that document 116 does not necessarily need to contain any form fields.

After the user has filled out the associated forms, the user clicks submit button 118 to submit the data from the completed packet of forms to the server. The data from the packet of forms is then aggregated into a single data unit and sent to the server all at once for processing.

In one embodiment of the present invention, the author of the packet of forms can use Adobe Acrobat™ to attach forms to document 116. The author can accomplish this by clicking on attachment tab 108, and then attaching the necessary forms or documents to document 116.

In one embodiment of the present invention, a script or program running on a server can select appropriate forms or documents based on information about the user. The script then attaches the forms or documents to document 116.

Note that though the forms or documents are attached to a main document (i.e. document 116), each associated form or document still retains its individual identity as a separate document. Therefore, the structure of the individual form is retained and collisions between field names in different attachments is thereby prevented. Note that the file containing the aggregated form data can concatenate each field name with its associated form name to prevent collision problems between field names. In another embodiment, forms can share common field names and in this case collisions between field names indicate that the field names are associated with the same data.

Furthermore, note that the forms can include any type of electronic form that includes fields that are designated for entry of data by a client. Moreover, these fields can be designated by a form author to be populated by a user, or can be populated in response to data entered by the user. For example, if the user fills in a postal code for an address, an application can automatically fill in the corresponding city and state of the address.

In one embodiment of the present invention, the associated forms can be disassociated from the document 116 if desired.

Note that since the packet of forms is a single document, the user can move between associated forms without having to submit each form separately to the server.

Generating Packet of Forms

Figure 2:
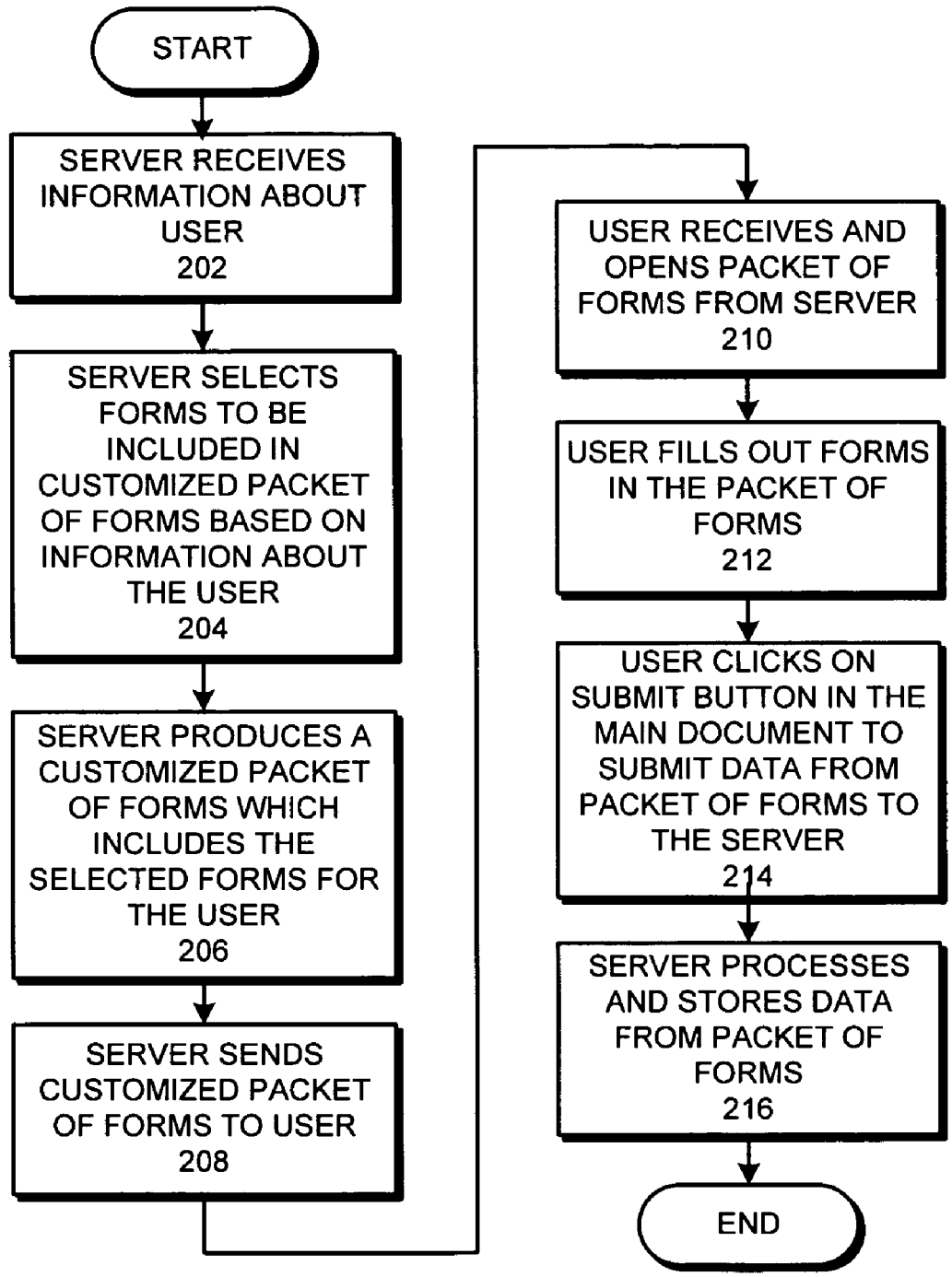
FIG. 2 presents a flow chart illustrating the process of generating a customized packet of forms for a user and processing the completed packet of forms from the user in accordance with an embodiment of the present invention.

FIG. 2 presents a flow chart illustrating the process of generating a customized packet of forms for a user, and then processing the completed packet of forms in accordance with an embodiment of the present invention. The process starts when the server receives information about a user (step 202). The server then selects forms to be included in the customized packet of forms based on the information about the user (step 204). Next, the server produces a customized packet of forms which includes the selected forms for the user (step 206). The server then sends the customized packet of forms to the user (step 208). After the user receives and opens the packet of forms from the server (step 210), the user fills out applicable forms in the packet of forms (step 212). Opening the packet of form involves opening the main document and the individual associated forms. When the user is done filling out the forms in the packet of forms, the user clicks on the submit button in the main document to submit data from the packet of forms to the server (step 214). Note that the data is aggregated into a single data unit and sent to the server all at once. The server then processes and stores the data from the packet of forms (step 216).

Extracting Data from Packet of Forms

Figure 3:
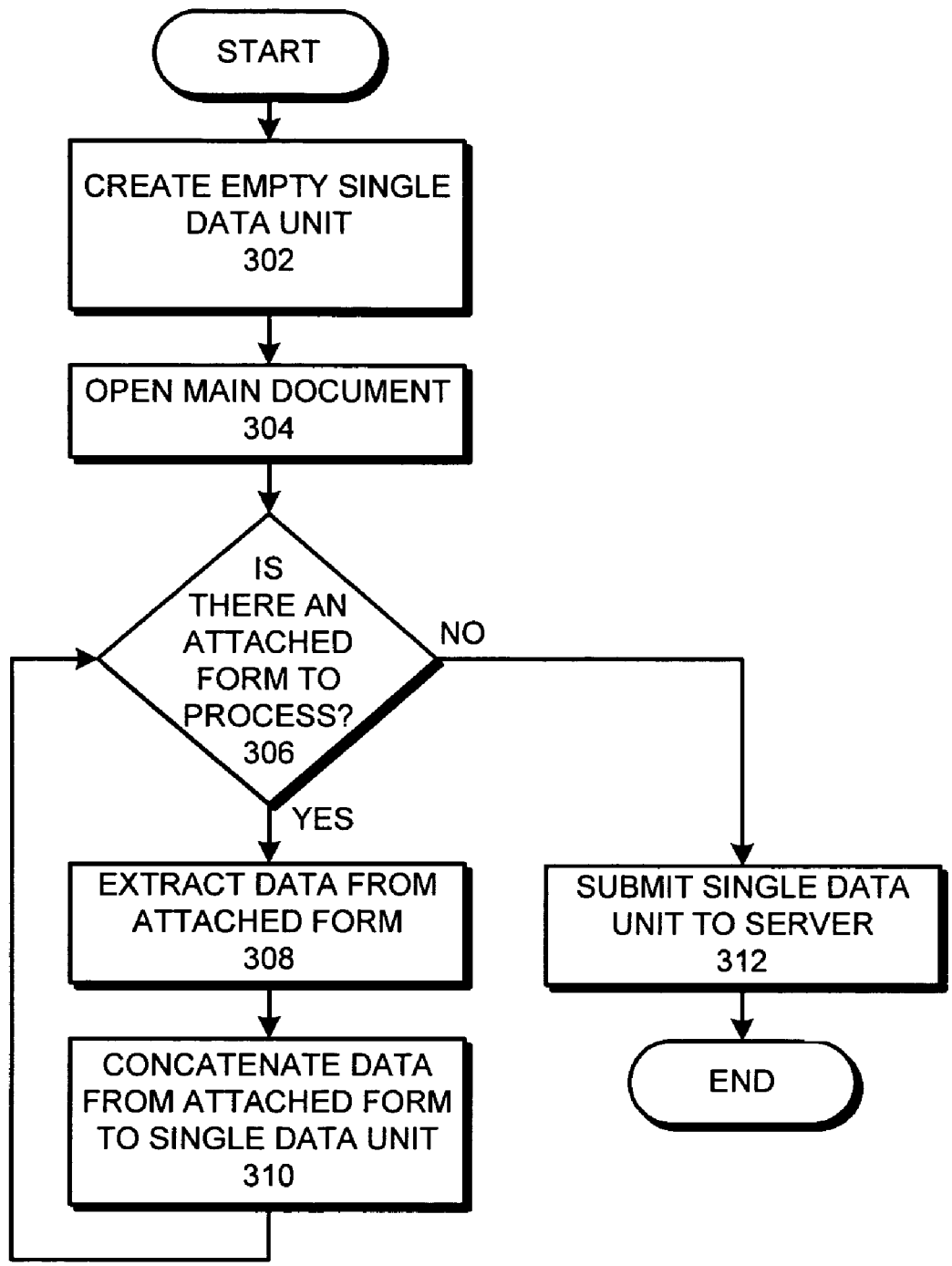
FIG. 3 presents a flow chart illustrating the process of extracting data from the customized packet of forms in accordance with an embodiment of the present invention.

FIG. 3 presents a flow chart illustrating the process of extracting data from the customized packet of forms in accordance with an embodiment of the present invention. The process expands on step 214 in FIG. 2. In one embodiment of the present invention, this process is controlled by a script written by the author of the packet of forms. This script extracts data from the packet of forms. The script can be written by a programmer or generated automatically from another program or script. Note that the script is written so that it is general enough to work with any combination of associated forms. In one embodiment of the present invention, the script is written in JavaScript.

In one embodiment of the present invention, the script can be written to manipulate the collected data from all of the attachments in any way that the form author sees fit, such that the server that receives it after submission can process it effectively. In one embodiment of the present invention, data is collected from each attachment using XML syntax and is aggregated using the available XML manipulation facilities provided by Adobe Acrobat™ to JavaScript developers. The server can use available XML software to process the received data.

The process illustrated in the flow chart begins by creating an empty single data unit (step 302). This single data unit is used to hold any data extracted from the associated forms. The script then opens the main document (step 304). If there is an associated form to process (step 306), the script extracts data from the associated form (step 308) and concatenates data from the associated form to the single data unit so that data from every associated form in the customized packet of forms is included in the single data unit (step 310). The script continues cycling through this loop until there are no more associated forms. When there are no more associated forms, the script submits the single data unit to the server (step 312). Note that the script can be written to recursively extract data if an attachment contains a lower-level attachment.

A sample script that extracts and aggregates data from the packet of forms appears in Table 1.

TABLE 1

```
var oParent = this; // The "main" document)
var oDataObjects = oParent.dataObjects; // dataObjects are the "attachments"
if (oDataObjects == null)
    app.alert("This form has no attachments!"); else {
    var oSubmitData = oParent.xfa.datasets.createNode("dataGroup",
"globalSubmitRootNode");
    var nChildren = oDataObjects.length;
    for (var iChild = 0; iChild < nChildren; iChild++) {
        var oNextChild = oParent.openDataObject(oDataObjects[iChild].name);
oSubmitData.nodes.append(oNextChild.xfa.data.nodes.item(0).clone(true/*recursively*/));
        oNextChild.closeDoc( );
    }
    oParent.submitForm({cURL: "http://server.com/cgi-bin/processData.cgi",
cSubmitAs: "XML", oXML: oSubmitData});
}
```

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for aggregating and submitting data from a customized packet of forms, comprising:
   creating a single data unit for storing form data which is initially empty;
   opening a main document, wherein the main document has a plurality of associated forms;
   for each associated form in the main document,
      extracting data from client-populated fields in the associated form,
      concatenating data from the associated form to the single data unit so that data from every associated form in the customized packet of forms is aggregated into the single data unit; and
   submitting the single data unit comprising the concatenated data from the plurality of associated forms.

2. The method of claim 1, wherein if the main document is also a form, the method further comprises:
   extracting data from the main document; and
   concatenating data from the main document to the single data unit.

3. The method of claim 1, wherein prior to extracting the data from the main document, the method further comprises:
   receiving information about a user;
   selecting forms to be included in the customized packet of forms based on the information about the user;
   producing a customized packet of forms which includes the selected forms; and
   sending the customized packet of forms to the user.

4. The method of claim 3, wherein after the user receives the customized packet of forms, the user is allowed to:
   open the customized packet of forms;
   fill out forms in the customized packet of forms; and click on a submit button in the main document to submit data from the customized packet of forms.

5. The method of claim 1, wherein in response to determining an associated form contains lower-level associated forms, the method further comprises recursively:
   opening each lower-level associated form in the associated form;
   extracting data from each lower-level associated form; and
   concatenating data from each lower-level associated form to the single data unit.

6. The method of claim 1, wherein a script in the main document is used to extract data from the associated form; and wherein the script is written so that script is general enough to work with any combination of associated forms.

7. The method of claim 1, wherein submitting the single data unit involves submitting the single data unit to a server.

8. An apparatus that aggregates and submits data from a customized packet of forms, comprising:
   a storage device storing instructions computer-executable to implement:
   a client; and
   a submission mechanism within the client; wherein the submission mechanism is configured to:
      create a single data unit for storing form data which is initially empty;
      open a main document, wherein the main document has a plurality of associated forms;
      for each associated form in the main document,
         to extract data from client-populated fields in the associated form, and
         to concatenate data from the associated form to the single data unit so that data from every associated form in the customized packet of forms is aggregated into the single data unit; and
      to submit the single data unit comprising the concatenated data from the plurality of associated forms.

9. The apparatus of claim 8, wherein the main document is also a form, the submission mechanism is configured to:
   extract data from the main document; and
   concatenate data from the main document to the single data unit.

10. The apparatus of claim 8, wherein prior to extracting the data from the main document, a server is configured to:
   receive information about a user;
   select forms to be included in the customized packet of forms based on the information about the user;

produce a customized packet of forms which includes the selected forms; and send the customized packet of forms to the user.

11. The apparatus of claim 10, wherein after the user receives the customized packet of forms, the client is configured to allow the user to:

open the customized packet of forms;

fill out forms in the customized packet of forms; and click on a submit button in the main document to submit data from the customized packet of forms.

12. The apparatus of claim 8, wherein in response to determining an associated form contains lower-level associated forms, the submission mechanism is configured to recursively:

open each lower-level associated form in the associated form;

extract data from each lower-level associated form; and concatenate data from each lower-level associated form to the single data unit.

13. The apparatus of claim 8, wherein a script in the main document is used to extract data from the associated form; and wherein the script is written so that script is general enough to work with any combination of associated forms.

14. The apparatus of claim 8, wherein submitting the single data unit involves submitting the single data unit to a server.

15. A computer-readable storage device storing instructions that when executed by a computer cause the computer to perform a method for aggregating and submitting data from a customized packet of forms, the method comprising:

creating a single data unit for storing form data which is initially empty;

opening a main document, wherein the main document has a plurality of associated forms;

for each associated form in the main document, extracting data from client-populated fields in the associated form, concatenating data from the associated form to the single data unit so that data from every associated form in the customized packet of forms is aggregated into the single data unit; and submitting the single data unit comprising the concatenated data from the plurality of associated forms.

16. The computer-readable storage device of claim 15, wherein the main document is also a form, the method further comprises:

extracting data from the main document; and concatenating data from the main document to the single data unit.

17. The computer-readable storage device of claim 15, wherein prior to extracting the data from the main document, the method further comprises:

receiving information about a user;

selecting forms to be included in the customized packet of forms based on the information about the user;

producing a customized packet of forms which includes the selected forms; and sending the customized packet of forms to the user.

18. The computer-readable storage device of claim 17, wherein after the user receives the customized packet of forms, the user is allowed to:

open the customized packet of forms;

fill out forms in the customized packet of forms; and to click on a submit button in the main document to submit data from the customized packet of forms.

19. The computer-readable storage device of claim 15, wherein in response to determining an associated form contains lower-level associated forms, the method further comprises recursively:

opening each lower-level associated form in the associated form;

extracting data from each lower-level associated form; and concatenating data from each lower-level associated form to the single data unit.

20. The computer-readable storage device of claim 15, wherein a script in the main document is used to extract data from the associated form; and wherein the script is written so that script is general enough to work with any combination of associated forms.

21. The computer-readable storage device of claim 15, wherein submitting the single data unit involves submitting the single data unit to a server.

* * * * *